US006891524B2

(12) United States Patent
Sakashita

(10) Patent No.: US 6,891,524 B2
(45) Date of Patent: May 10, 2005

(54) DISPLAY DEVICE WITH AMPLIFICATION CONTROL

(75) Inventor: Yukihiko Sakashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 09/927,479

(22) Filed: Aug. 13, 2001

(65) Prior Publication Data

US 2002/0050987 A1 May 2, 2002

(30) Foreign Application Priority Data

Aug. 14, 2000 (JP) ........................................ 2000-245964

(51) Int. Cl.$^7$ ............................................... G09G 3/36
(52) U.S. Cl. ......................................................... 345/89
(58) Field of Search ............................. 345/87, 88, 89, 345/98, 100, 5, 117, 119

(56) References Cited

U.S. PATENT DOCUMENTS 5,969,820 A * 10/1999 Yoshii et al. ................ 356/623
6,535,224 B2 * 3/2003 Kuriyama et al. .......... 345/690
6,624,862 B1 * 9/2003 Hayashi et al. ............. 349/119

FOREIGN PATENT DOCUMENTS

JP            11-65528        3/1999

* cited by examiner

Primary Examiner—Chanh Nguyen
(74) Attorney, Agent, or Firm—Fitzpatrick, Cella, Harper & Scinto

(57) ABSTRACT

To prevent lowering of dynamic range and deterioration of image quality, when an image is displayed in a liquid panel in a state of being irradiated with light, the luminance of an illumination light is changed corresponding to the luminance of the entire image. In this way, compared to the case where the luminance of the illumination light is not changed, the dynamic range can be increased. Further, a picture signal applied to each picture element of a liquid panel is judged individually, and if it is not more than a standard luminance $A_1$, it is amplified by a large amplification factor, and if it is not less than a standard amplification factor $A_2$, it is amplified by a small amplification factor, whereby a contrast of the image not more than the standard luminance $A_1$ is improved. Even for the image not less than $A_2$, the contrast does not disappear, but the image is recognizable.

14 Claims, 16 Drawing Sheets

INPUT IMAGE

AFTER MODULATION OF ILLUMINATION LIGHT AMOUNT

AFTER AMPLIFICATION OF PICTURE SIGNAL

DISPLAY DEVICE WITH AMPLIFICATION CONTROL

BACKGROUND OF THE INVENTION

1. Field of the Invention

The present invention relates to a display device for displaying an image.

2. Related Background Art

Conventionally, the display devices for displaying images have been classified by:

(1) a projection type for displaying images by projecting on a screen a light modulated by a light modulation element such as a liquid panel or the like, and
(2) a direct vision type in which a light modulated by a light modulation element such as a liquid panel or the like is visualized as it is and recognized as an image.

By the way, in any of the display devices of the above-described projection type and direct vision type, an illumination light was irradiated to the light modulation element. However, this has caused a problem of a low dynamic range.

SUMMARY OF THE INVENTION

Hence, it is an object of the present invention to provide a display device for preventing a lowering of the dynamic range.

The present invention was achieved in view of the above described situation, and it is another object of the present invention to provide a display device comprising:

a light source for emitting a light;

a light modulation element for modulating the emitted light; and picture signal inputting means for receiving a picture signal from the outside and inputting a driving signal for driving the light modulation element to the light modulation element, in which the light modulation element modulates the light based on the picture signal and an image is displayed, wherein the picture signal inputting means comprises target light amount calculating means and light amount controlling means, the target light amount calculating means being means for calculating an adequate light amount for an image display and the light amount controlling means being means for receiving the signal from the target light amount calculating means and controlling the light so as to obtain a target light amount; and wherein the picture signal inputting means largely amplifies the driving signal when the picture signal has a low luminance and slightly amplifies the driving signal when the picture signal has a high luminance.

It is still another object of the present invention to provide a display device comprising:

a light source for emitting a light;

a light modulation element for modulating the emitted light; and picture signal inputting means for receiving a picture signal from the outside and inputting a driving signal for driving the light modulation element to the light modulation element, in which the light modulation element modulates the light based on the picture signal and an image is displayed, wherein the picture signal inputting means comprises target light amount calculating means and light amount controlling means, the target light amount calculating means being means for calculating an adequate light amount for an image display and the light amount controlling means being means for receiving the signal from the target light amount calculating means and controlling the light modulated by the light modulation element so as to obtain a target light amount; and wherein the picture signal inputting means changes a signal amplification factor for changing input output conversion characteristics corresponding to an output of the target light amount calculating means.

BRIEF DESCRIPTION OF THE DRAWINGS

FIGS. 9A-1, 9A-2, 9A-3, 9B-1, 9B-2, 9B-3, 9C-1, 9C-2 and 9C-3 are schematic illustration showing an example of image display;

DETAILED DESCRIPTION OF THE PREFERRED EMBODIMENTS

Figure 1:
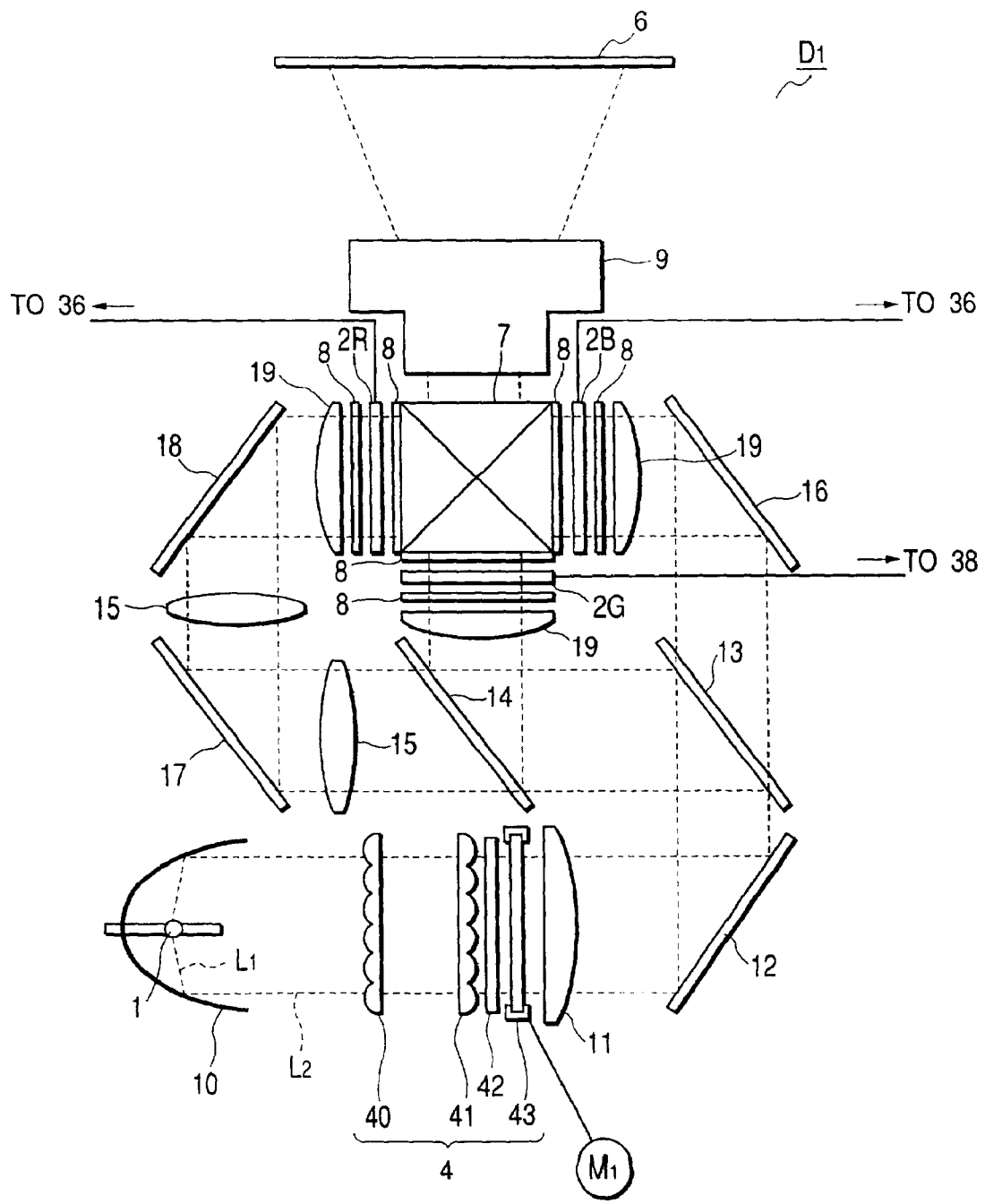
FIG. 1 is a schematic view of one embodiment according to the present invention.

In the present invention, a picture signal mainly means a signal transmitted from the outside of the display device of the present invention to the display device. For example, it means the signal given to a DSP portion referred to by reference numeral 32 of FIG. 2.

A light modulation element indicates, for example, as described later, the so-called liquid crystal panel such as a light bulb, a light shutter or the like or an element referred to as DMD in which a mirror is arranged for each picture element. The element in which a mirror is arranged for each picture element can adequately adjust the angle of the mirror by an electrostatic force or a magnetic force.

Driving signal means a signal given to the light modulation element for driving the light modulation element. For example, it means the signal given to each color panel (each light modulation element) shown by reference numerals 2R, 2G, 2B, which is transmitted from the DSP of reference numeral 32 of FIG. 2. Although in FIG. 2 there are installed DA 35 and a panel driver 36 between the panels and the DSP, if the driving signal is a signal transmitted from the DSP of reference numeral 32 to each panel (each light modulation element) as shown by reference numerals 2R, 2G, 2B, even if the signal itself changes in its route, the information necessary for driving the light modulation element is delivered to the light modulation element, and a desired driving may be executed. This status was also shown in FIG. 1. In FIG. 1, each color panel 2R, 2G, 2B is connected respectively to the panel drive 36 of FIG. 2 by a line indicated as "TO 36". In other words, each panel 2R, 2G, 2B is substantially connected to the DSP 32 respectively.

The picture signal inputting means may at least comprise the target light amount calculating means and the light amount controlling means.

Amplification in the present invention means an increase or a decrease of a value from the initial value.

Figure 3:
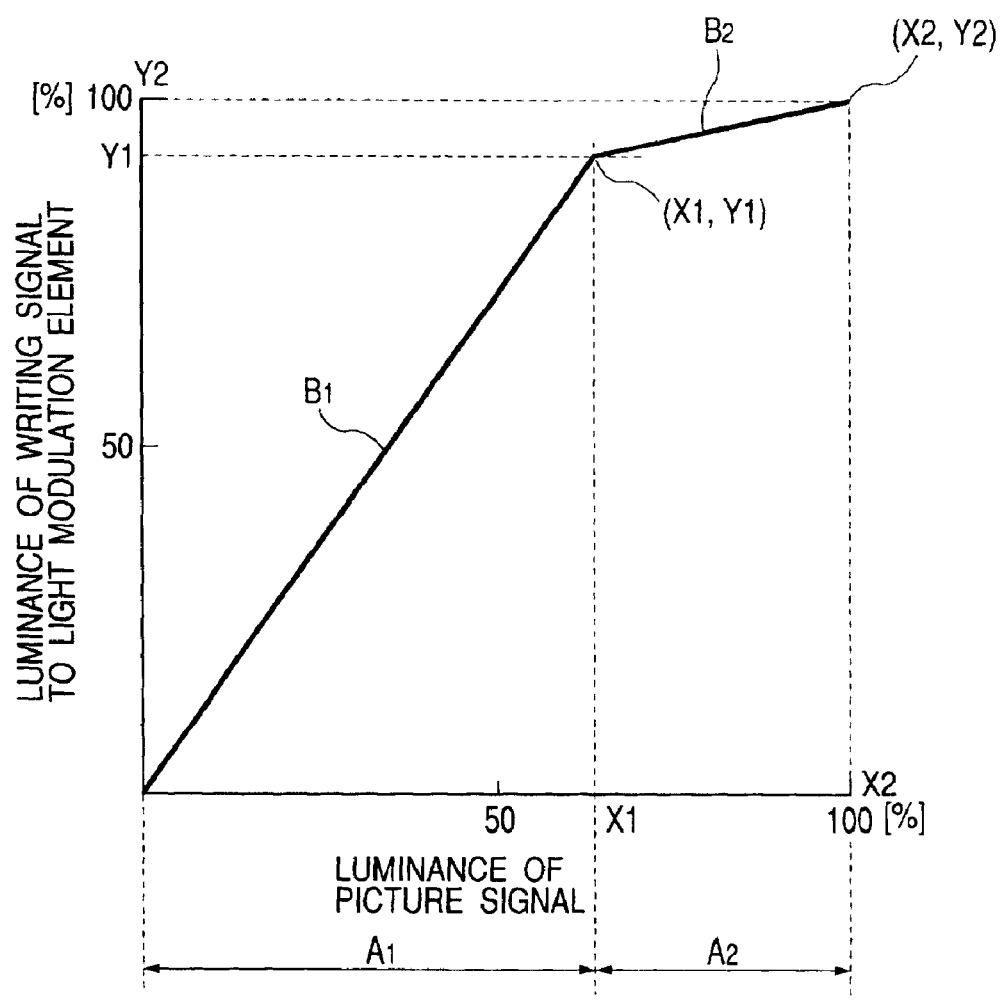
FIG. 3 is a graph for explaining a relation between a luminance of a picture signal and a luminance of a writing signal.

A 100% state in a Y-axis (axis of ordinates) means the maximum bright state (white state) and 0% means the maximum dark state (black state) in FIGS. 3, 10, 12 and 13. The "LUMINANCE OF WRITING SIGNAL" described on the Y-axis means luminance information given to the light modulation element based on the writing signal and "LUMINANCE OF PICTURE SIGNAL" means the luminance information that the external signal has. Although a description will be given later, in each of FIGS. 3, 10, 12 and 13, lines B1 to B6 are illustrated. A tilt of this line is an amplification factor. In FIG. 3, the lines B1 and B2 having different tilts from each other are connected at a point (X1,Y1). That is, at this point, the amplification factor differs. The point of change of this amplification factor is preferably positioned within the range of not more than 99% and not less than 50% or more preferably within the range of not more than 90% and not less than 70% in the value of the Y-axis.

The embodiments of the present invention will be described below with reference to FIG. 1 to FIG. 6.

The display device according to the present invention, as illustrated in FIG. 1 by reference symbol $D_1$, comprises a light source 1 for emitting a light; light modulation elements 2R, 2G and 2B for modulating the emitted light; and picture signal inputting means (refer to reference numeral 3 of FIG. 2) for inputting picture signals to the light modulation elements 2R, 2G and 2B, and the display device is constituted in such a manner that the light modulation elements 2R, 2G and 2B modulate the light based on the picture signals so as to display an image. Here, the above-described picture signal inputting means 3 is constituted in such a manner that, as shown in FIG. 3, when the picture signal has a low luminance, it largely amplifies the signal (see reference symbol $A_1$) and, when the picture signal has a high luminance, it minutely amplifies the signal (see reference symbol $A_2$). When the picture signal has a high luminance, the amplification factor is small and hence a gradation image quality is deteriorated, but this deterioration may be prevented by executing a pseudo-multi-gradation processing (the detail will be described in Example 1).

Figure 5:
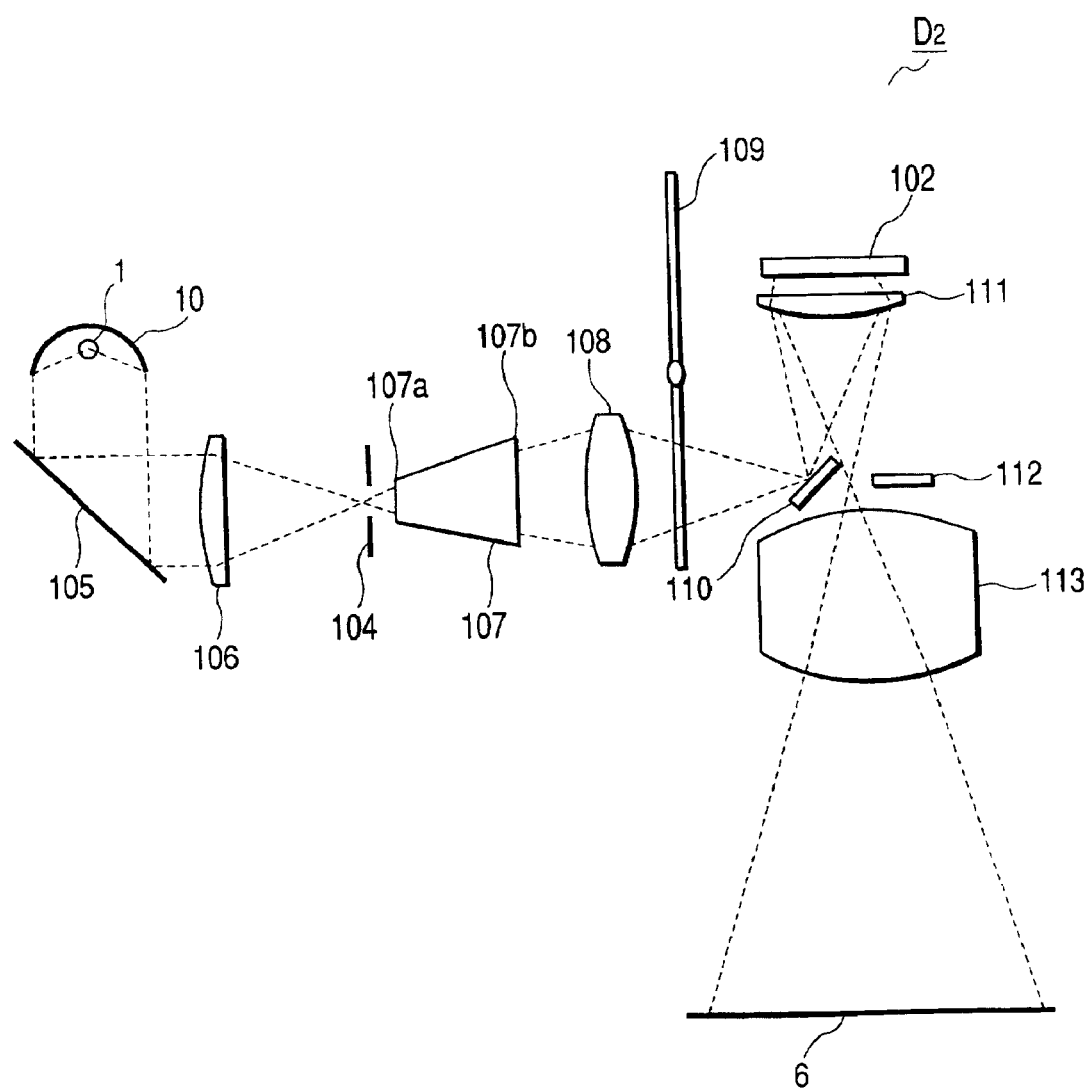
FIG. 5 is a schematic view showing another embodiment of a display device according to the present invention.
Figure 6:
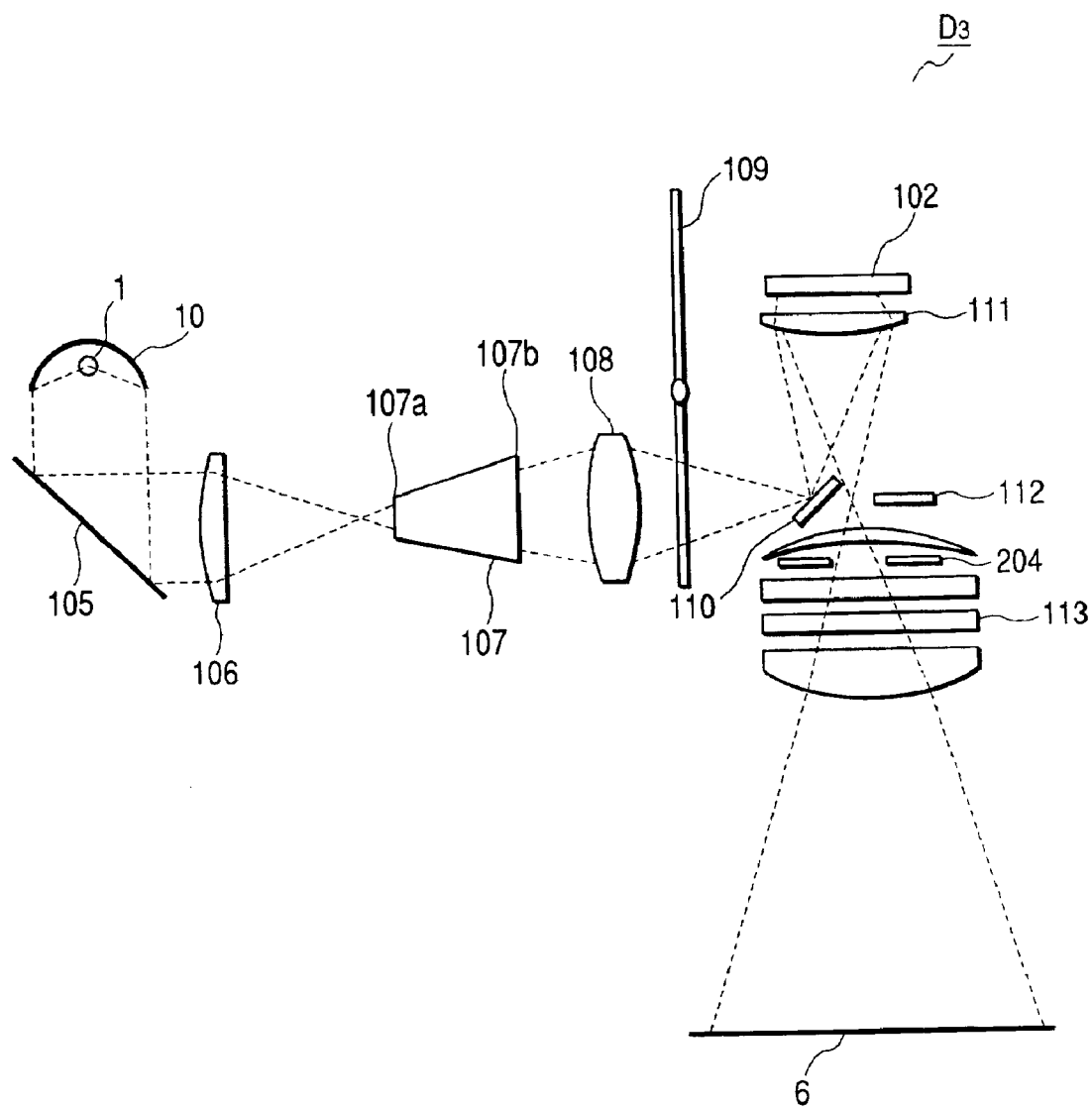
FIG. 6 is a schematic view showing still another embodiment of the display device according to the present invention.

This display device $D_1$ comprises a target light amount calculating means (see reference numeral 5 of FIG. 4) for calculating an adequate quantity of light (hereinafter, referred to as "target light amount") for an image display and light amount controlling means 4 for receiving the signal from the target light amount calculating means 5 and controlling the above-described light (that is, the light emitted from the light source 1 and supplied for the image display) so as to provide the target light amount. As the light amount controlling means 4, there can be listed:

<1> a type which is attached to the above described light source 1 and controls the light itself which is emitted from the light source 1 by controlling the electric current and the voltage of the light source 1 (refer to Japanese Patent Application Laid-Open No. 11-65528), <2> a type which is, as shown by reference numeral 4 of FIG. 1 and reference numeral 104 of FIG. 5, arranged on the optical path of the light irradiated from the above-described light source 1 to the above described light modulation elements 2R, 2G and 2B (reference numeral 102 in FIG. 5) and controls its light amount, and <3> a type which is, as shown in FIG. 6 by reference numeral 204, arranged on the optical path of the light modulated by the above-described light modulation element 102 and controls its light amount. As for those belonging to <2> and <3>, there can be listed:

(i) those comprising a member for converting a light to a polarization light flux (refer to reference numeral 42 of FIG. 1) and a light amount adjusting member (which is a member shown by reference numeral 43 and, for example, a polarization plate, a phase plate or the like) for controlling a permeable amount of the polarization light flux, and wherein by changing the rotational position of the light amount adjusting member 43, the amount of the polarization light flux which permeates the light amount adjusting member 43 is controlled, and (ii) those having a diaphragm structure (refer to reference numeral 104 of FIG. 5 and reference numeral 204 of FIG. 6).

Here, the diaphragm 204 shown in FIG. 6 is on the optical path (on the optical path from the light modulation element 102 to a member to be projected 6) of the light modulated by the above-described light modulation element 102 and arranged in the inside of a projection lens group 113 comprising a plurality of lenses. In the case where the light controlling means is arranged as described in the above <3>, the above-described picture signal inputting means 3 may amplify, when the picture signal has a low luminance, the signal by the amplification factor of 1 or more. In this case, when the picture signal has a high luminance, the above-described picture signal inputting means 3 may amplify the signal by an amplification factor not larger than the amplification factor in the case of the picture signal having a low luminance. In this way, the effect that the dynamic range can be made higher can be obtained by the light amount control, and by the amplification of the picture signal, the contrast of a low luminance image can be raised higher.

In case of using the polarization plate and the phase plate, though they can be placed at any place if they are in the optical path of the polarization light flux, it is preferable that they are arranged at the place closer to the light source 1 as shown in FIG. 1 so that the light amount is intensified. However, if the polarization plate or the like are brought too near to the light source 1, they are in danger of deterioration by the light and heat from the light source 1. Hence, it is necessary to keep a certain degree of distance therebetween or use a material (for instance, made of sapphire) rich in heat resistance and light fastness so as not to be deteriorated.

As the means for allowing these polarization plate and the phase plate to rotate, a motor can be used and, in particular, a ultrasonic motor and a stepping motor are preferable in view of a driving speed (that is, responsibility to the light amount control) and an accuracy of the light amount control.

Though either of the polarization plate and the phase plate may be used, in the case where a λ/2 plate (a ½ wavelength plate) is used, a phase of the light flux emitted from the λ/2 plate rotates by 2θ for a straight line polarization light flux incident on the λ/2 plate (provided that θ is a rotational angle of the λ/2 plate). Accordingly, about half of the rotational angle of the polarization plate is enough as the rotational angle for the phase plate and, the time required for reaching the target light amount is shortened by that much (that is, the responsibility of the light amount control is improved) and it is preferable. Also, a loss of the light amount for the phase plate is a little which is about 2 to 3% (the loss of the light amount for the polarization plate is about 15%) and it is preferable. Here, in the case where the polarization plate is used, when a straight line polarization direction of the polarization light flux and a polarization direction of the polarization plate are in parallel, almost all light flux of 85% pass through the polarization plate and, by allowing the polarization plate to rotate, the light amount is reduced.

On the other hand, as for the light modulation elements 2R, 2G, 2B and 102, there can be listed a liquid crystal panel for displaying information by utilizing a liquid crystal, DMD (Digital Mirror Device, which modulates the light amount by changing an angle of the mirror) panel or the like as disclosed in Japanese Patent Application Laid-Open No. 10-78550, which may be either a permeable type or a reflection type.

The above-described display device may be either the projection type (that is, the type in which the light modulated by the light modulation elements 2R, 2G, 2B, 102 is projected to a member to be projected 6 such as a screen or the like and an image is displayed) or a direct viewing type (that is, the type in which the light modulated by the light modulation elements 2R, 2G, 2B, 102 is viewed as it is).

Though a substantial change in the light amount is possible within a short time depending on the type of motors, if such a change in the light amount is made, a change in the luminance becomes too rapid that it might give human eyes a sense of incongruity. Hence, it is better that even when the light amount control is excellent, if necessary, change of the light amount is made moderate so that it does not give human eyes a sense of incongruity.

Next, the effects of the present embodiments will be described.

According to the present embodiments, the light to be supplied to the image display is controlled in the light amount by the light amount controlling means 4, 104, 204. Accordingly, when the luminance of an image is low on the whole, the light amount is reduced, and when the luminance of the image is high on the whole, the light amount can be increased. In comparison with the case where such a light amount is not controlled, high dynamic range can be realized.

According to the present embodiments, the picture signal of a low luminance is amplified to such a large extent that, for a low luminance image, an image quality of high contrast can be obtained.

On the other hand, when the picture signal of a high luminance is also amplified, though a luminance difference disappears (refer to the area of 75% to 100% of FIG. 13), according to the present embodiment, it is only to be slightly amplified so that there remains no problem. In the area of high luminance display, by executing a pseudo-multi-gradation processing, an image quality (gradation display performance) can be maintained.

The present invention will be described below more in detail according to the examples.

EXAMPLE 1

In the present example, a projection type display device $D_1$ was prepared as shown in FIG. 1.

That is, as for the light modulation elements, by using three liquid panels corresponding to each color display of R, G, B, these three liquid crystal panels 2R, 2G, 2B were arranged in positions opposing to a cross prism 7. In the present example, as the liquid crystal panels 2R, 2G and 2B, TN liquid crystal panels which are driven by using TFT were used. On both sides of these panels, the polarization plates 8 were installed respectively in such a manner as to interpose each of liquid crystal panels 2R, 2G and 2B therebetween and on a light emitting side of the cross prism 7, a projection lens 9 and a screen 6 (a member to be projected) were arranged.

On the other hand, a parabolic reflector 10 was arranged in such a manner as to surround a lamp (a light source) 1 and convert a light emitted from the lamp 1 into a parallel light flux. This reflector 10 may be not of a parabolic, but of an oval type which converts the light into a light-gathering flux. As the lamp 1, a metal halide lamp or a Xenon lamp can be used.

The light amount controller (light amount controlling means) 4 was arranged on the optical path of a light emitted from the lamp 1 and constituted by fly eyes integrators 40 and 41, a PS conversion optical element 42, which is constituted by a polarization beam splitter and a λ/2 plate and converts a non-polarization light flux to a polarization light flux, a phase plate (light amount adjusting member) 43 that is supported rotationally and an ultrasonic motor (USM) $M_1$ for rotating the phase plate 43. Each of the fly eyes lens 40 and 41 at the incident side was allowed to have a conjugate relation with the liquid crystal panels 2R, 2G, 2B. In addition, the ultrasonic motor $M_1$ is provided with an encoder so as to control a rotational angle with a high accuracy of ±0.1% or less.

Now, at the light emitting side of this light amount controller 4, the relay lens 11 and the mirror 12 were arranged in order. In addition, two dichroic mirrors 13 and 14 were arranged and the emitted light from the lamp 1 was branched into three portions, which were led to each of the liquid crystal panels 2R, 2G and 2B by arranging a relay lens 15 and mirrors 16, 17 and 18. Reference numeral 19 shows a field lens.

Figure 2:
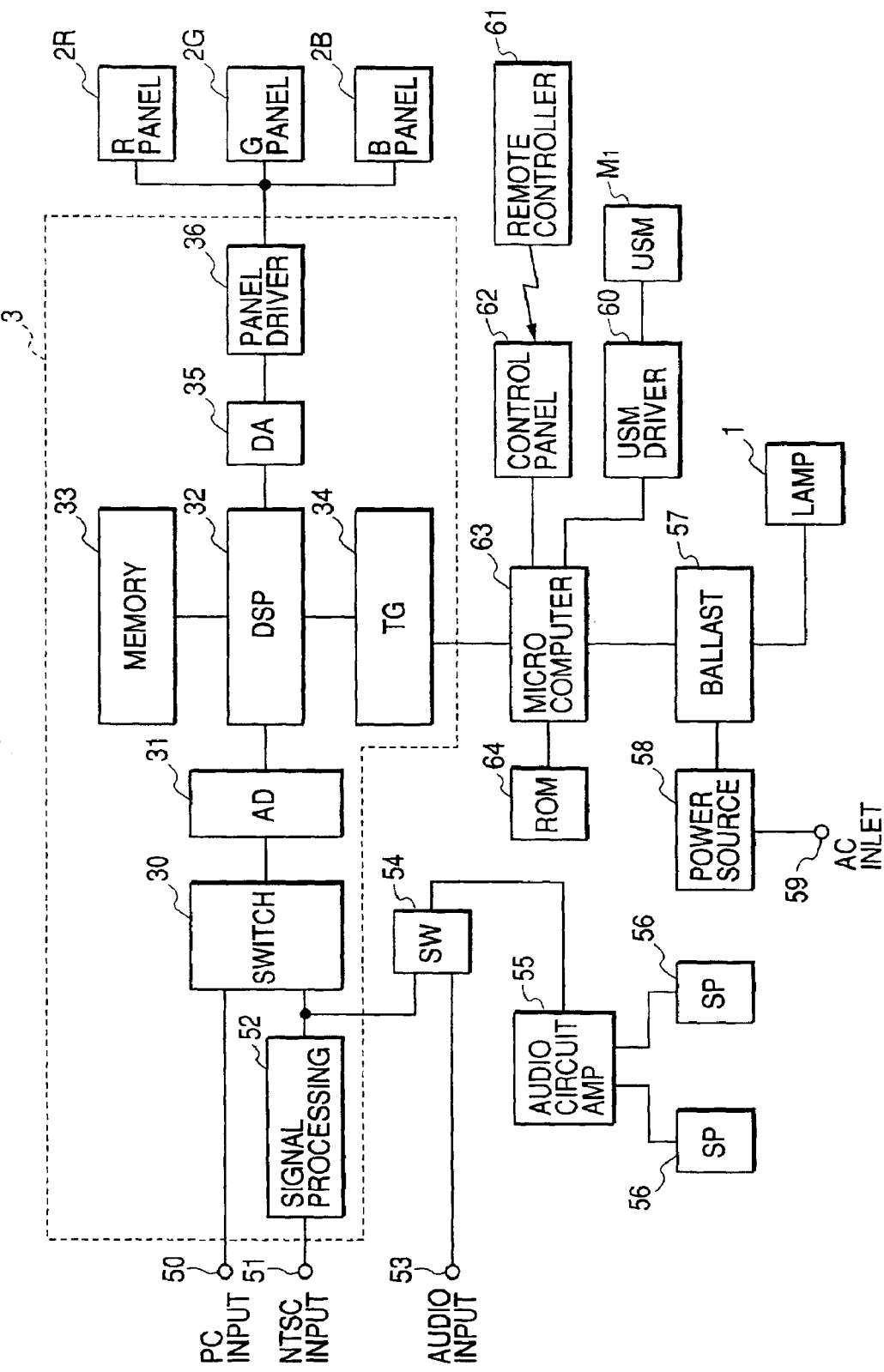
FIG. 2 shows a block diagram of one embodiment according to the present invention.

By the way, the above-described liquid crystal panels 2R, 2G and 2B were connected to the picture signal inputting means 3 or the like as shown in FIG. 2. The details thereof will be described below.

Reference numeral 30 shows a switch and reference numeral 31 shows an AD converter. Reference numeral 32 shows a DSP portion and reference numeral 33 shows a memory which stores current display data and data to be displayed by subsequent frames or the like. Reference numeral 34 shows a timing generation circuit and reference numeral 35 shows a DA converter. Reference numeral 36 shows a driver circuit which provides a signal and a power source to be applied to each liquid crystal panel.

On the other hand, reference numeral 50 shows a PC (personal computer) input terminal and reference numeral 51 shows an NTSC input terminal. Here, in the present block diagram, though only the analogue input signal is shown, it is not limited to this, but, needless to mention, input terminals such as LVDS, TMDS or the like as well as a three-terminal for use of a digital TV or the like can be effectively arranged.

Reference numeral 52 shows a signal processing circuit, which executes signal processing such as a decoding of NTSC signal, a noise reduction processing, a bandwidth limiting filtering, a signal level adjustment or the like.

Reference numeral 53 shows an audio input terminal and reference numeral 54 shows an audio selection switch. Reference numeral 55 shows an audio processing circuit and reference numeral 56 shows a speaker.

Reference numeral 57 shows a ballast to be connected to the lamp 1, and reference numeral 58 a power source, and reference numeral 59 an AC inlet.

Reference numeral 60 shows a USM driver which controls the driving of the ultrasonic motor $M_1$ and reference numeral 61 shows a remote controller for executing various operations of the present display device. Reference numeral 62 shows a control panel for receiving a signal from the remote controller.

Further, reference numeral 63 shows a microcomputer and reference numeral 64 shows ROM. This microcomputer 63 is connected to the above-described picture signal inputting means 3, control panel 62, USM driver 60, ballast 57 or the like and allowed to control the ultrasonic motor $M_1$, the liquid crystal panels 2R, 2G and 2B, the lamp 1 and the like.

Figure 4:
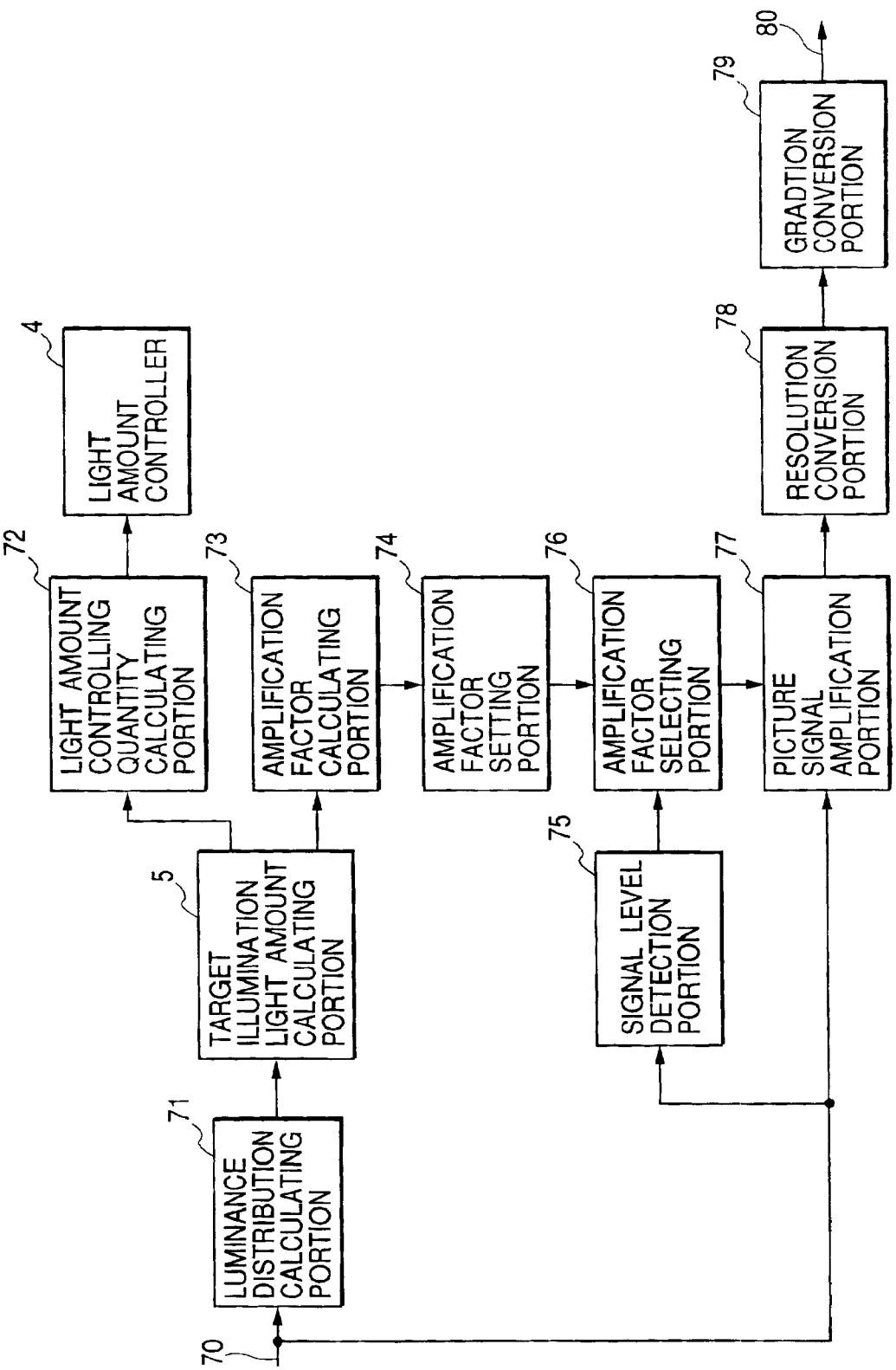
FIG. 4 is a block diagram showing a structure of a DSP portion.

Though the DSP portion 32 is constituted as shown in FIG. 4, the detail will be described later.

Next, the operation of the present example will be described.

The non-polarization light flux $L_2$ emitted from the lamp 1 is reflected in part by a reflector 10 to be converted to a parallel light flux (refer to reference character $L_1$), and the flux is made incident on the fly eyes integrators 40 and 41 to execute the uniformity of luminance distribution and color distribution therein and then converted by a PS conversion element 42 to a straight line polarization light flux (having a ratio of the P light and the S light of not less than 20:1). The light flux is adjusted in the light amount when it passes through the phase plate 43. Because the ratio of the P light and the S light is 20:1, the light amount can be reduced down to 1/20.

After that, the light flux permeates the relay lens 11 and is reflected by the mirror 12. Only a light of blue color component permeates the dichroic mirror 13, and it is reflected by the mirror 16 and irradiated to the liquid crystal panel 2B through the lens 19. A light of green color component is reflected by the dichroic mirrors 13 and 14 and irradiated to the liquid crystal panel 2G through the lens 19. Further, a light of red color component is reflected by the dichroic mirror 13 and then it permeates the dichroic mirror 14 and the relay lens 15, is reflected by the mirror 17, permeates the relay lens 15, is reflected by the mirror 18, permeates the lens 19 and is irradiated to the liquid crystal panel 2R.

The light of each color is modulated by each of liquid crystal panels 2R, 2G and 2B and, after that, synthesized by the cross prism 7 and projected to the screen 6.

Next, the detail of the above-described light amount control and the driving of the liquid crystal panels 2R, 2G and 2B will be described.

Now, when an analogue picture signal is inputted to the input terminals 50 and 51, the signal is converted into a digital signal by the AD converter 31 and stored in the memory 33. Here, in the memory 33, the current display data and the data to be displayed by subsequent frames or the like are stored.

Figure 7:
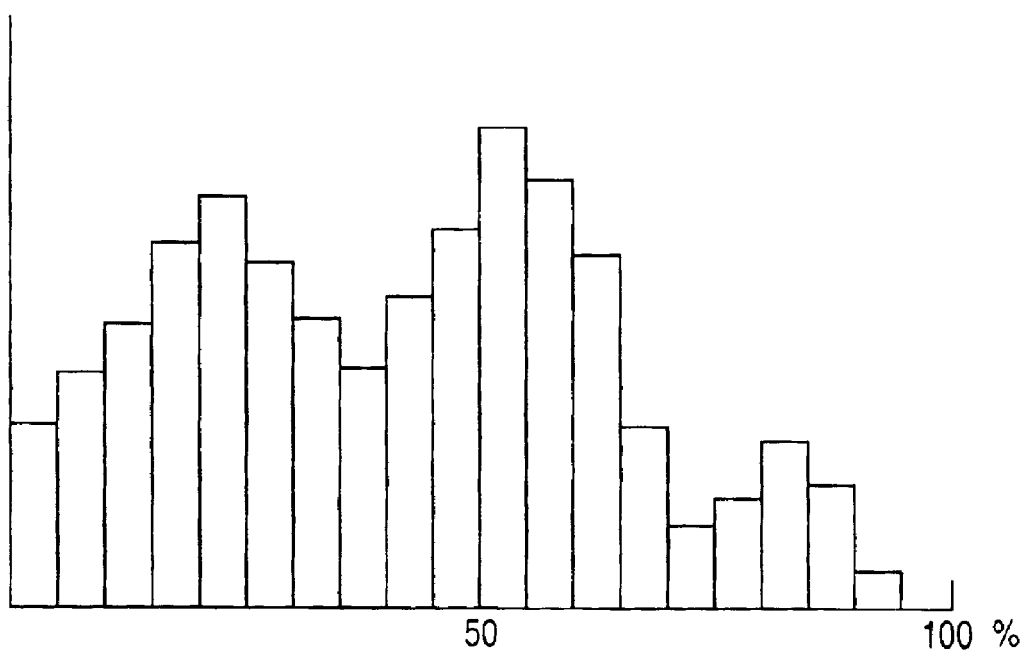
FIG. 7 is a graph showing one example of a histogram of the picture signal.

When the digital picture signal stored in the memory 33 is inputted to the DSP 32 (refer to S101 of FIG. 8), in an luminance distribution calculating portion 71, as shown in FIG. 7, a histogram of the signal level of one frame portion is calculated (refer to S102 of FIG. 8) and the number of picture signals is classified for each luminance range as shown in the following table.

TABLE 1

| Display luminance range [%] | Number of counts |
| --- | --- |
| 95–100 | 0 |
| 90–95 | 7200 |
| 85–90 | 8650 |
| 80–85 | 4203 |
| 75–80 | 2252 |
| 70–75 | 422 |
| 65–70 | 5365 |
| 60–65 | 8782 |
| . | . |
| . | . |
| . | . |

Figure 8:
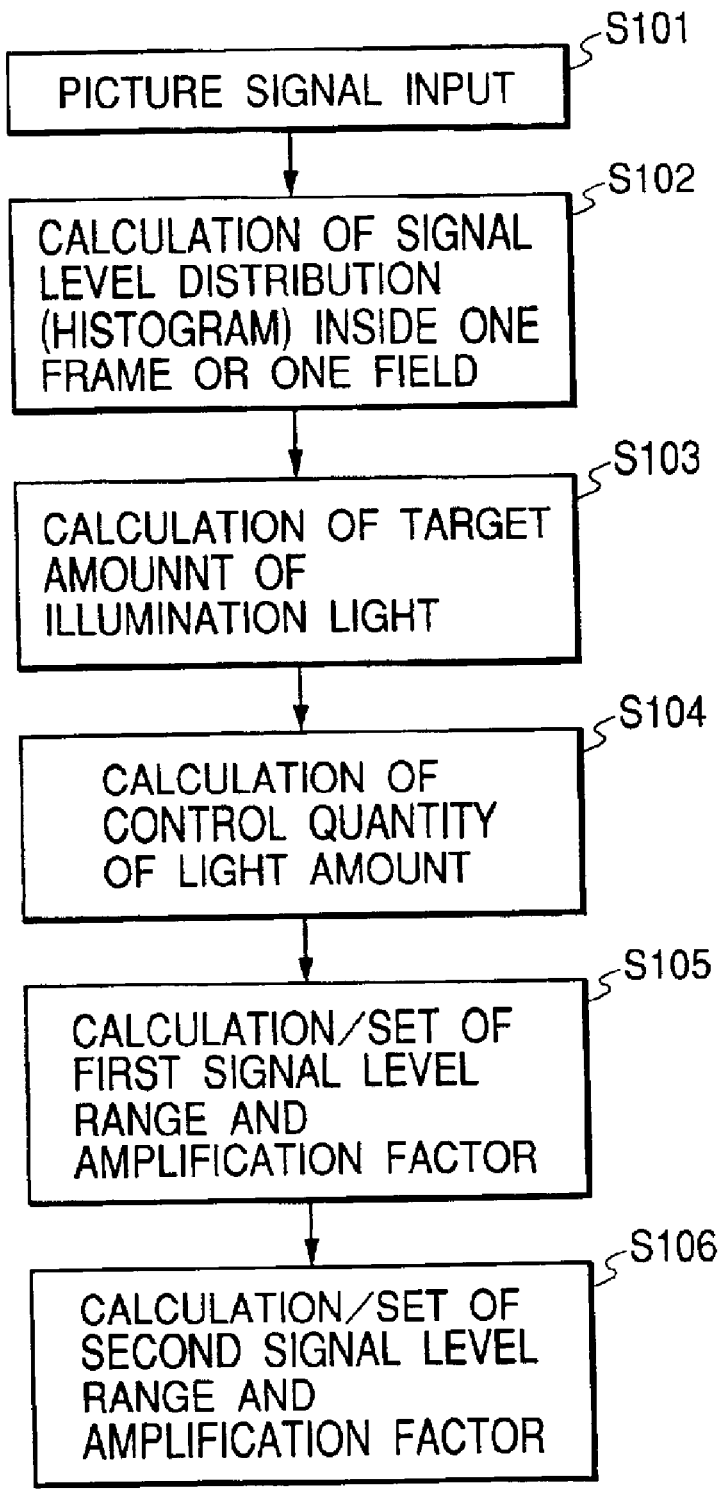
FIG. 8 is a flow chart for explaining one example of a control method of the display device.

Based on such a result, in a subsequent target illumination light amount calculating portion 5, a target light amount is calculated (refer to S103 of FIG. 8). That is, a luminance range to which the 20000th picture signal from 100% luminance side belongs (a luminance range of 75 to 80% in the example of the above described table) is calculated, and the lower limit value of that range is taken as the target light amount (75% in the above-described example).

This target described table) is calculated, and the lower the light value of that range is taken as the target light portion 72, and a light amount controlling quantity is calculated (refer to S104 of FIG. 8) so as to realize the above-described illumination light amount, and the driving of the ultrasonic motor $M_1$ of the light amount controller 4 is controlled. What is referred to as "light amount controlling quantity" here is a rotational angle of the phase plate 43, and when the electrical current and the voltage of the lamp 1 is adjusted by the light amount controller, the adequate electrical current value and the adequate voltage value may be calculated.

By the above-described control, the amount of the light which permeates the light amount controller 4 becomes the target light amount value of 75%. This illumination light amount is changed corresponding to an image luminance for every frame period.

In the present example, not only the illumination light amount is controlled as described above, but also a judgment is made as to whether the picture signal is lower or higher than a predetermined luminance for every picture element (that is, a judgment is made as to whether it is the picture signal within the low luminance range as indicated by reference character $A_1$ in FIG. 3 or the picture signal within the high luminance range as indicated by reference character $A_2$), and <1> the picture signal which belongs to the low luminance range $A_1$ is amplified by a large amplification factor, and <2> the picture signal which belongs to the high luminance range $A_2$ is amplified by a small amplification factor.

The above-described points will be described below.

First, in an amplification factor calculating portion 73 as shown in FIG. 4, two types of amplification factors such as the amplification factor to be used in the above-described low luminance range $A_1$ and the amplification factor to be used in the above-described high luminance range $A_2$ are calculated (refer to S105 and S106 of FIG. 8). Here, the amplification factor to be used in the low luminance range $A_1$ is an amplification factor such as of amplifying the picture signal of 75% luminance to the picture signal of 100%.

By the way, because the above-described amplification factor is used in the low luminance range $A_1$ of 0% to 67%, the maximum luminance (refer to reference character Y1 of FIG. 3) within that range is 67%×(100/75)≅90%. The picture signal having a luminance of 100% (=X2) need to have a luminance of 100% (=Y2) also after the amplification. Accordingly, the luminance distribution in the high luminance range $A_2$ need to be a straight line $B_1$ which connects point (X1, Y1) and point (X2, Y2), and the amplification factor (that is, the amplification factor to be used in the high luminance range $A_2$) need to be a tilt (=(Y2−Y1)/(X2−X1)) of the straight line $B_1$. In the present example, this amplification factor was taken as 0.3. The two amplification factors calculated in this way are set in an amplification installation portion 74 (refer to S105 and S106 of FIG. 8).

Figure 16:
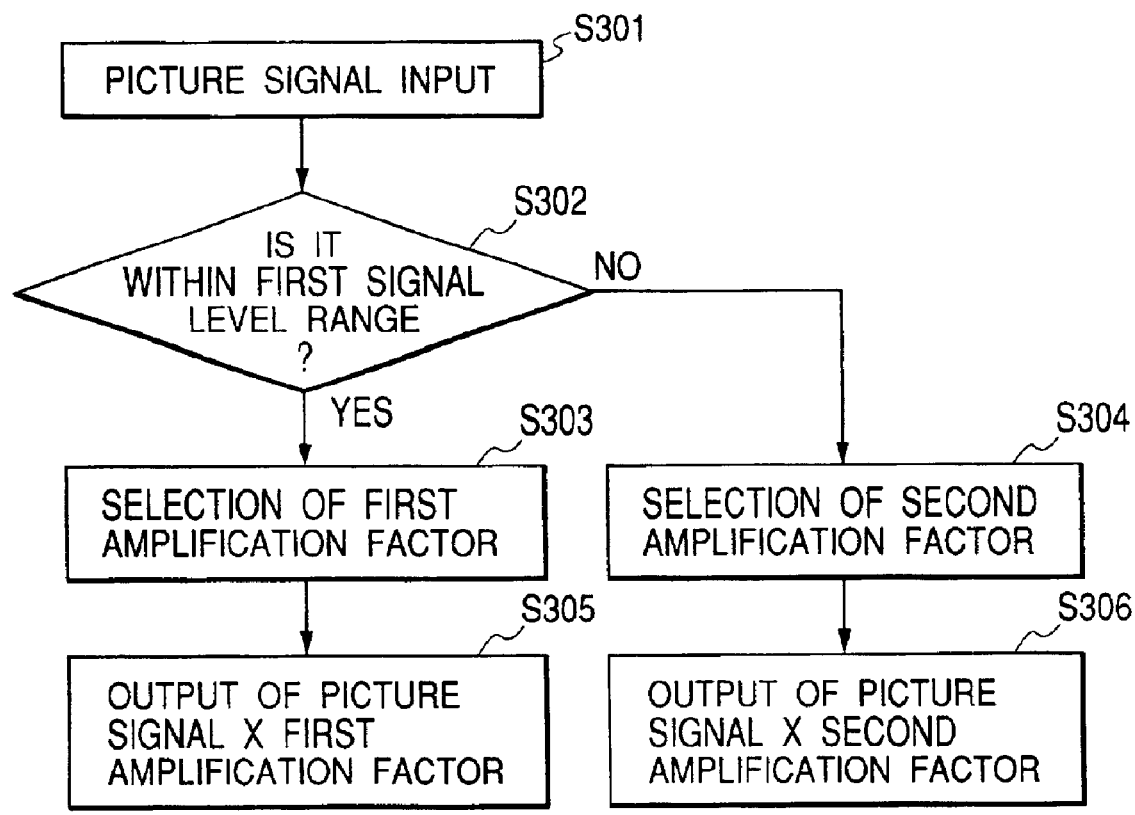
FIG. 16 is a flowchart for explaining one example of the control method of the display device.

On the other hand, the picture signal which was inputted to the DSP portion 32 is inputted not only to an luminance distribution calculating portion 71, but also to a signal level detection portion 75 and a picture signal amplification portion 77 in this order, as shown in FIG. 4. The signal level detection portion 75 determines whether the luminance of each picture signal is lower or higher than the standard luminance (67%) (refer to S301 and S302 of FIG. 16), and an amplification selection portion 76 selects an amplification factor of (100/75) (refer to S303 of FIG. 16) when the picture signal is within the low luminance range and selects an amplification factor of 0.3 when the picture signal is within the high luminance range (refer to S305 of FIG. 16). The picture signal amplification portion 77 amplifies the picture signal by multiplying the selected amplification factors (refer to S305, S306 of FIG. 16). By the picture signals thus amplified, the liquid crystal panels 2R, 2G and 2B are driven.

In the high luminance range $A_2$, the magnification factor is reduced to 1 or more, thereby reducing the number of gradations. Therefore, in the amplification portion, by increasing an operand bit, deterioration of the number of gradations is prevented. In the present example, output 16 bits are set against input 16 bits, whereby the deterioration of the gradation does not occur when a second amplification factor is 0.0039 or more.

Next, in a resolution conversion portion 78, the number of picture elements is converted to a resolution for making a display.

Next, in a gradation conversion portion 79, an input image of 16 bits is converted to an 8 bits image corresponding to the display device. Here, by executing an error dispersion processing, a dither processing or the like, when 16 bits data is compressed to 8 bits data, a pseudo-multi-gradation processing is used in which a gradation is maintained by dispersing the error to peripheral picture elements.

The samples of the image displayed in the present example will be described according to FIG. 9.

Figures 1, 9A, 9B, 9C:
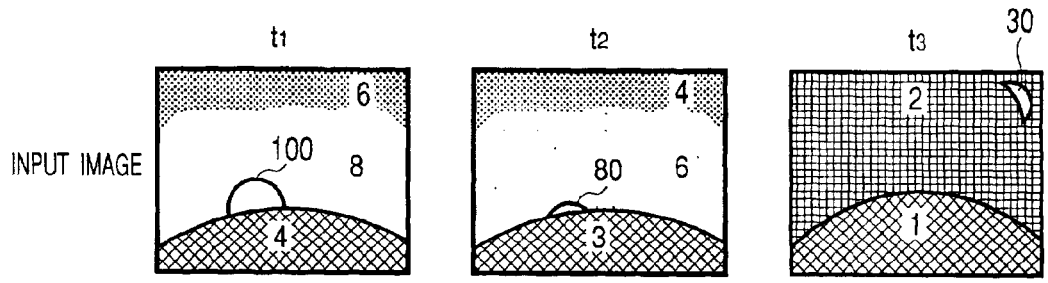
Figures 2, 9A, 9B, 9C:
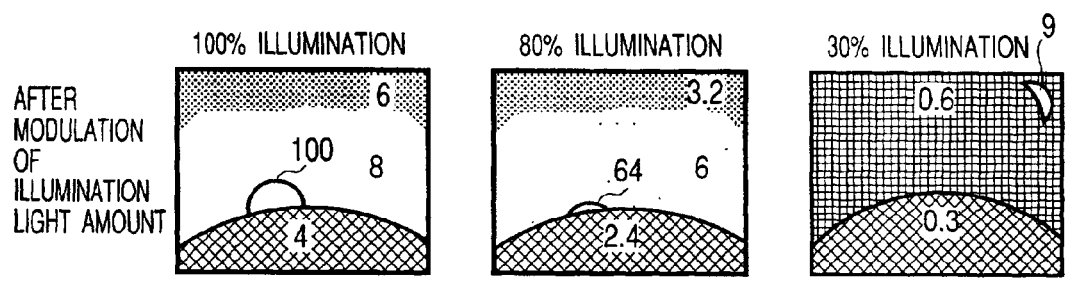
Figures 3, 9A, 9B, 9C:
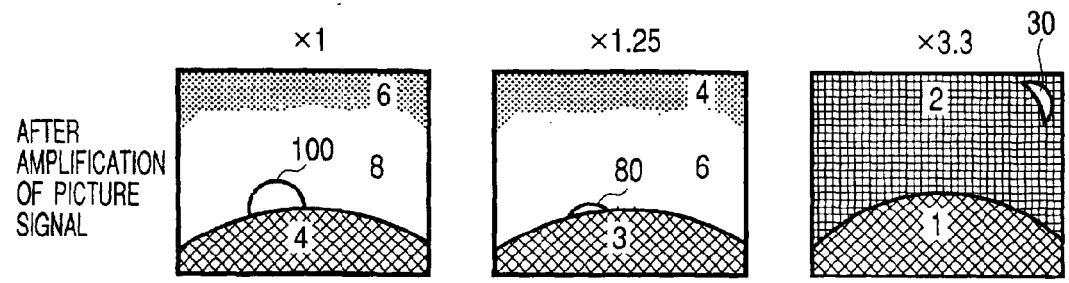

FIG. 9A-1 is an image at the time of a time t1, which shows a scene where the sun begins to go down behind a mountain and the recess of the mountain and the sky begin to darken. The numerical values in the drawings show a luminance level of the image. FIG. 9B-1 is an image after more time has passed than the time of FIG. 9A-1 and the sun goes down further and it is darker. The peak on that occasion is 80% level, compared to the previous image shown in FIG. 9A-1. Still more time passes and the night falls and the moon is up in the sky and the maximum luminance level reaches 30%. This case is shown in FIG. 9C-1.

Here, for each image data, a light of 100% level is irradiated to the liquid crystal panel for the image shown in FIG. 9A-1, a light of 80% level is irradiated to it for the image shown in FIG. 9B-1 and a light of 30% level is irradiated to it for the image shown in FIG. 9C-1. The display image for each case is shown in FIGS. 9A-2, 9B-2 and 9C-2, respectively. Here, the reduced amount of the irradiation light is replenished by amplifying the signal. The image shown in FIG. 9A-2 has no reduction in the light amount, so its amplification factor is taken as 1, and the image shown in FIG. 9B-2 has 1.25 times the amplification factor and the image shown in FIG. 9C-2 has 3.3 times the amplification factor. The results are shown in FIGS. 9A-3, 9B-3 and 9C-3 and the display luminance can be maintained.

As described above, by combining the modulation of a light amount and the amplification of a signal, the improvement of the contrast by controlling a light leaks (a black becomes whiter or a light seems to slightly leak) can be made, while maintaining the display luminance.

When the dynamic range of the liquid crystal panel is 200:1, if 100% light amount is irradiated thereto, though a luminance level of 0.5 or less can not be displayed for a black level, according to the present example, as the whole of the image begins to darken, a displayable area of the black level expands so that a much compressed black display can be realized. When the whole of the image is bright or when there are some influences from the reflected light from an external light, a recognition level of human eyes of minute differences of the black level is often lowered and therefore reproducibility of the black becomes not so prominent. However, the more the image becomes dark, the more its reproducibility is important. This matches with the above-described technique and, in the case of the above-described example, the contrast is substantially improved to about 660:1.

Particularly, in the case of the sources where there are many dark scenes such as movies, the effect of the present invention was made tremendous, and the image with an improved dynamic range and an excellent black reproducibility could be obtained.

In the present example, though a method of improving the contrast by replenishing the reduced illumination light amount with an amplified signal gain while maintaining the display luminance was described, in order to effectively use the dynamic range of LCD, a method of making the signal gain larger than the reduced amount of the illumination light is also effective.

For a writing signal conversion circuit, a multiplier may be used or a LUT (Look Up Table) which can set up conversion characteristics more in detail may be used. If a plurality of LUTs is used by switching them corresponding to signal levels, it is possible to control the conversion characteristics still more in detail. LUT can be constituted by using RAM or the like. Further, the contrast adjustment circuit which already exists in the picture signal processing circuit may be used.

Further, in the present example, though an example of the digitally amplifying method was described, a variable amplifier circuit in the analogue circuit may be designed to change the amplification factor.

In the present example, a display method according to the present invention is described. Information recording media such as semiconductor memory of CDROM, DVD, flush memory, ROM or the like in which a program of the display method according to the present invention is recorded are also included in the present example. The program recorded in CDROM or the like is read to a computer and a processing by the display method according to the present invention is executed.

In the present example, though a method of improving the contrast by replenishing the reduced illumination light amount with an amplified signal gain while maintaining the display luminance was described, in order to effectively use the dynamic range of LCD, a method of making the signal gain larger than the reduced amount of the illumination light is also effective.

Next, an effect of the present example will be described.

According to the present example, while the illumination light amount is controlled, the portion where the luminance is relatively high is lowered in the amplification factor and the portion where the luminance is low is raised in the amplification factor. Consequently, the same effect as described in the embodiments of the invention can be obtained, and while constantly maintaining the display luminance in intermediate colors (that is, even in the case where the light amount is lowered, while maintaining the luminance in which the low to intermediate luminance images are actually displayed at the same luminance as in the case where the light amount is not lowered, by increasing the amplification factor of the picture signal by the lowered amount of light), high dynamic range is realized and at the same time high image quality display without deterioration of the gradation can be realized.

There is also such an effect available that the image information is not lost even in the second area where the signal is compressed, by increasing the number of bits in the amplification portion and, after the resolution is converted, by maintaining the gradation in a spatial direction by a pseudo intermediate gradation display method such as the error distribution.

Further, in the present example, because the ultrasonic motor $M_1$ capable of driving at a high speed and having no backlash was used, the light amount control with good responsibility is possible and its quietness is excellent.

Here, an effect of the present example will be described in detail according to FIG. 10 to FIG. 13.

Figure 10:
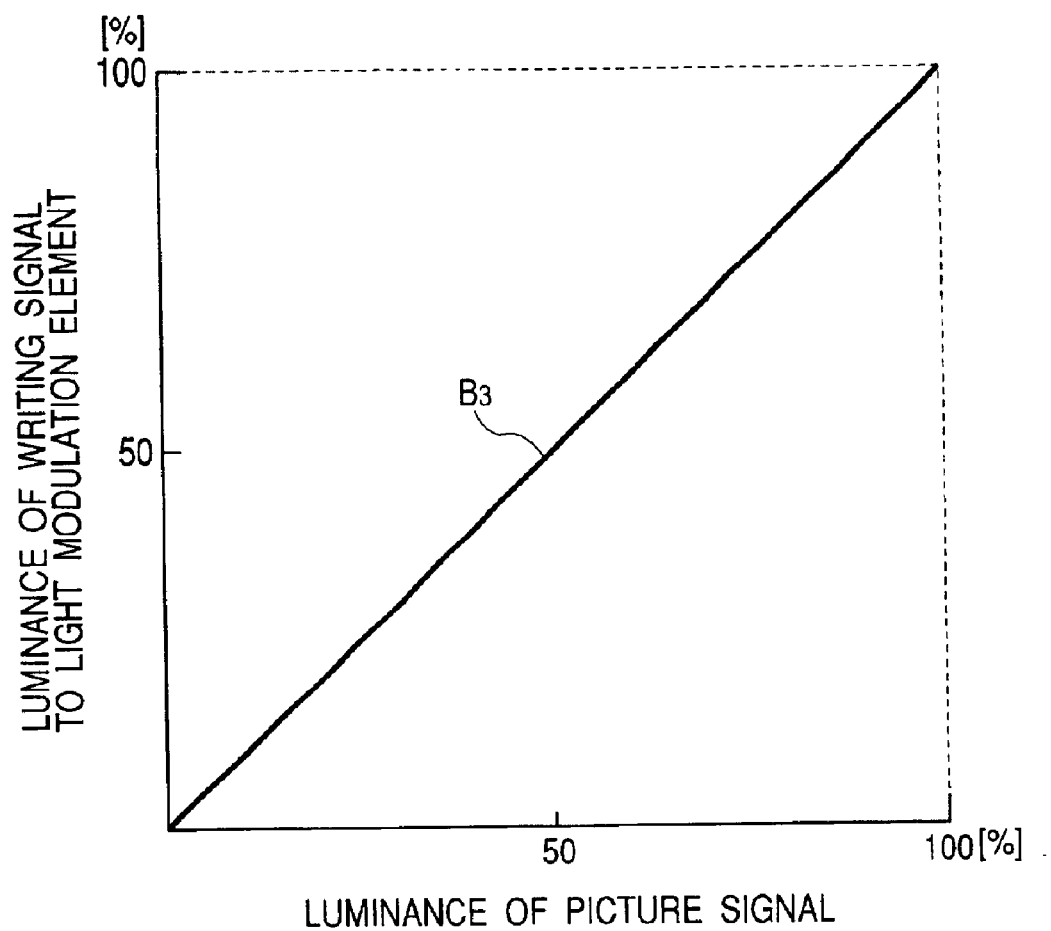
FIG. 10 is a graph for explaining an effect of the present invention.

When a picture signal is not amplified like the present example, the relation between the luminance of the picture signal (the picture signal inputted to the DSP portion 32) and the writing signal (the writing signal to the light modulation element) is shown as FIG. 10, and an image is displayed with the luminance as it is by the picture signal inputted to the DSP portion 32.

Figure 11:
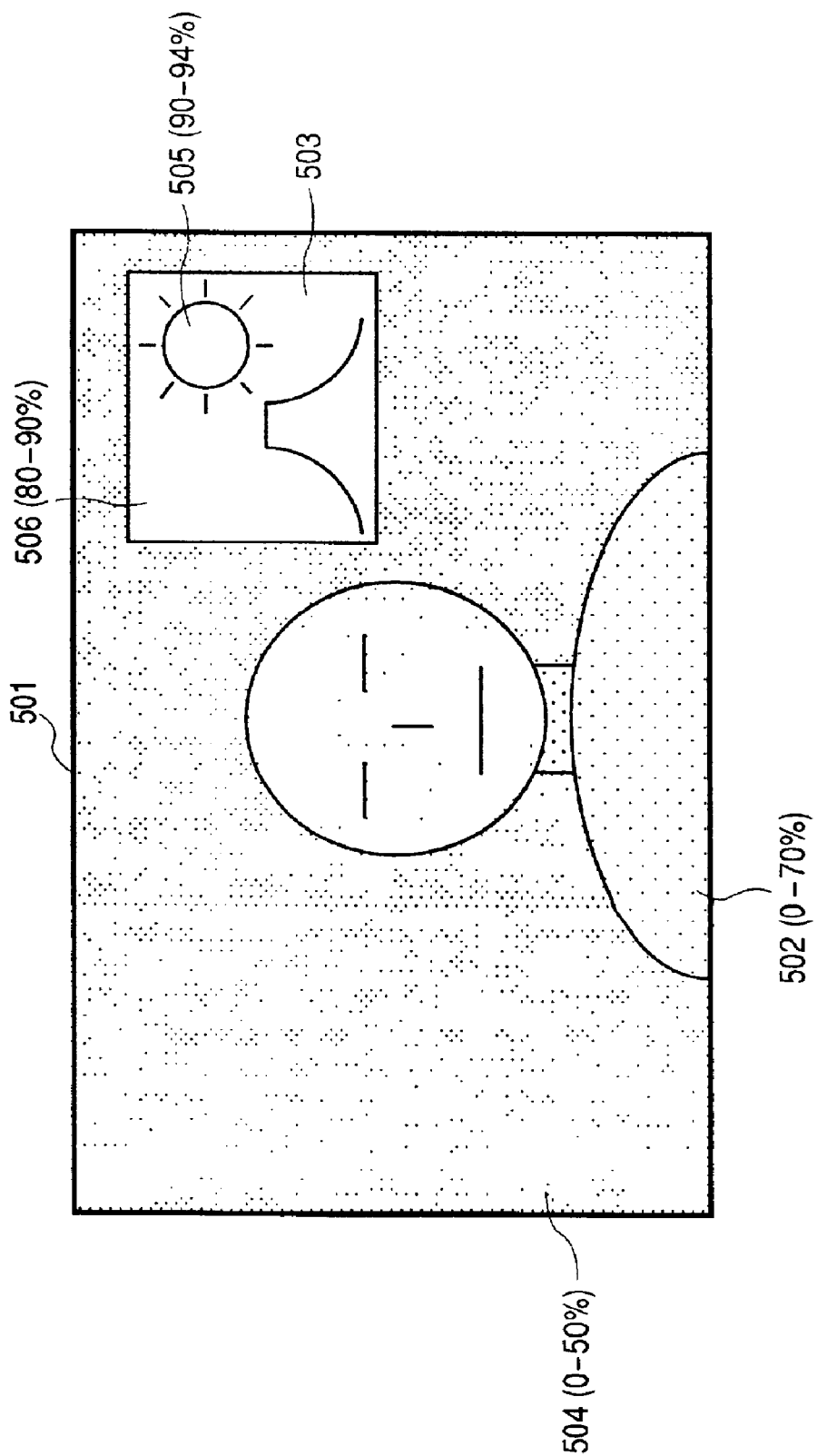
FIG. 11 is a schematic illustration for explaining the effect of the present invention.
Figure 12:
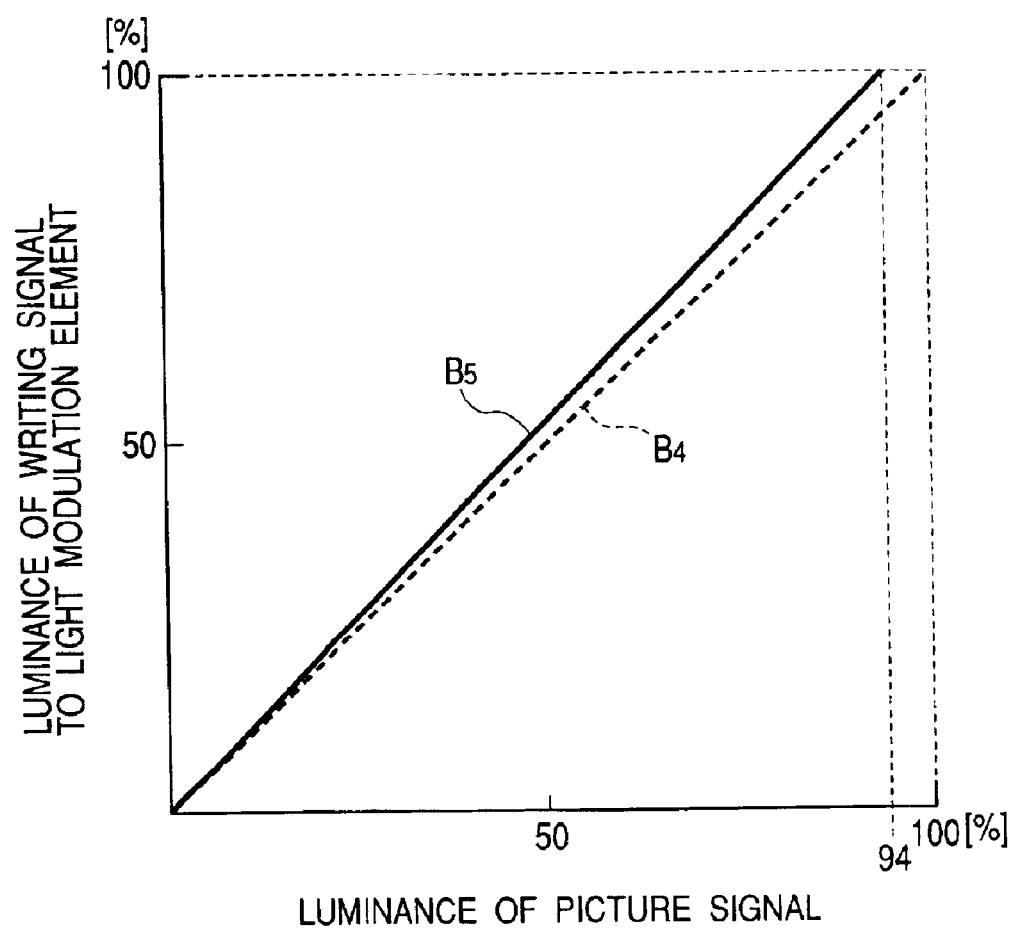
FIG. 12 is a graph for explaining the effect of the present invention.

Now, when an image as shown in FIG. 11 begins to be displayed, the image luminance of each portion is assumed such that it is 0 to 70% for a person 502 in the center of the image, 90 to 94% for the sun which is seen from a window 503 in the right corner and 80 to 90% for the scene (a mountain or the like) other than the sun. In the case of this image, the maximum luminance is 94% and the whole range of the display luminance from 0% to 100% is not utilized. Hence, all the picture signals are amplified by the same amplification factor (=100/94) and a relational line between the image signal luminance and the writing signal luminance is changed from the line as shown by reference character $B_4$ to the line as shown by reference character $B_5$. However, the contrast in such a case is improved only by 6% and not much effect can be obtained. (That is, the contrast of the person 502, which is the image worthy of attention inside the image, is not improved and there is a problem that a sufficient effect of improving the image quality by raising the dynamic range is not obtained).

Figure 13:
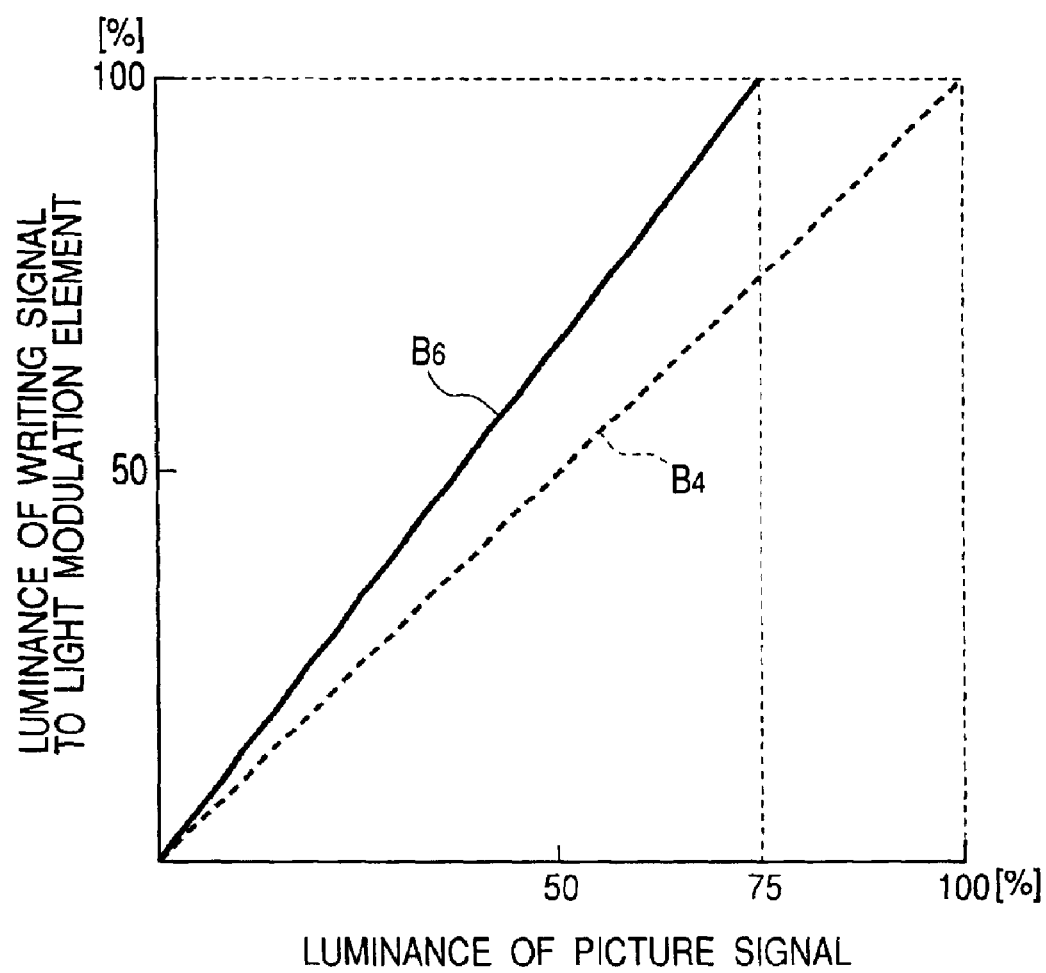
FIG. 13 is a graph for explaining the effect of the present invention.

On the other hand, as shown in FIG. 13, when the amplification factor (in this case too, the same amplification factor is used for all the picture signals) is magnified, for example, when the amplification factor is magnified to 100/75, though the contrast is greatly improved by about 33% (that is, the person 502 worthy of attention can obtain a sufficient improvement of the display image quality), on the other hand, the portion where the initial luminance was 75% or more (in the example of FIG. 11, the portion of the scene which is seen from the window 503) is evenly amplified to the luminance of 100% and the image of the above-mentioned high luminance portion disappears.

According to the present example, the effect can be obtained such that the contrast of the low luminance portion becomes good and the image of the high luminance portion does not disappear.

EXAMPLE 2

Figure 14:
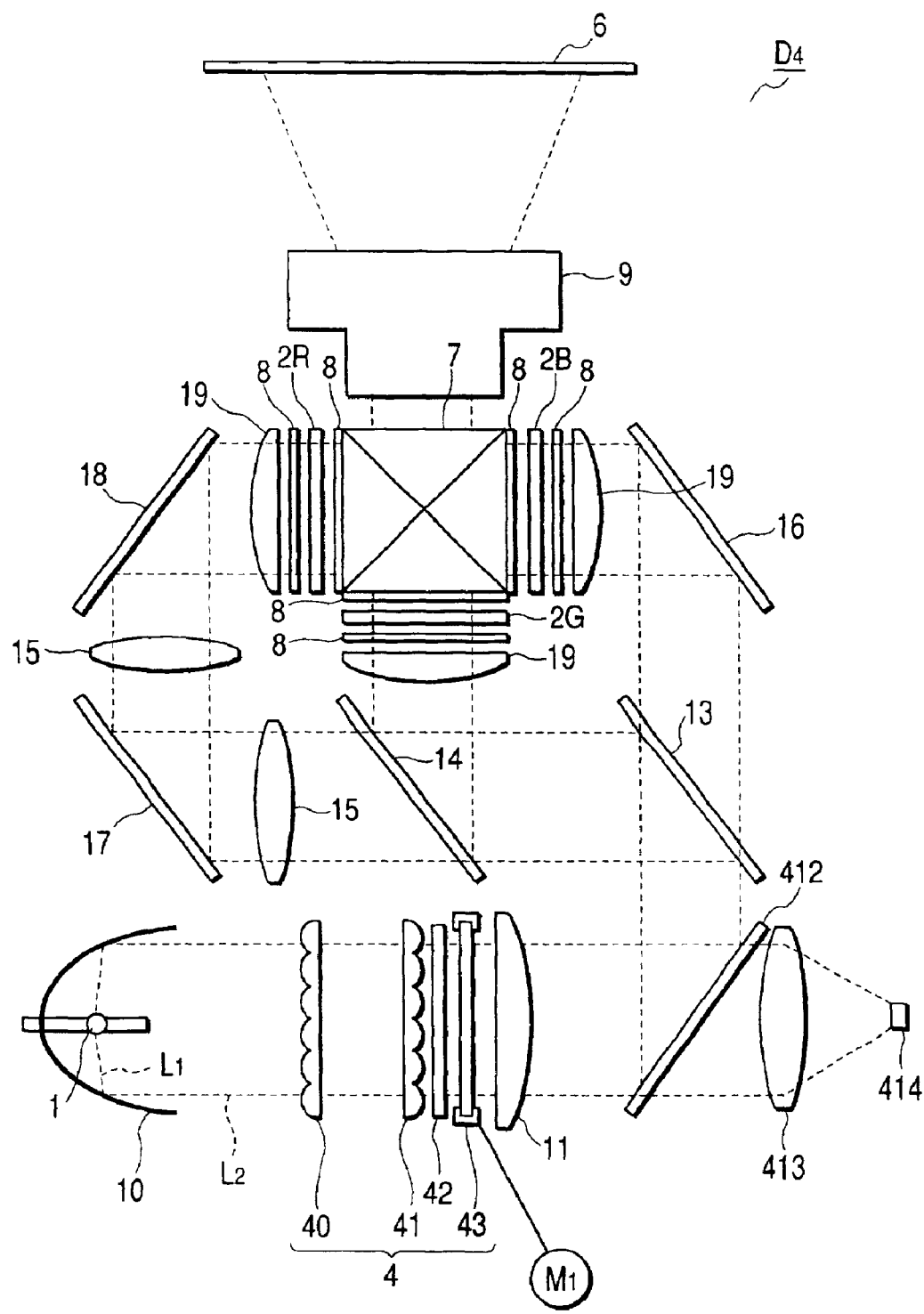
FIG. 14 is a schematic showing another structural example of the display device.

In the present example, a display device $D_4$ as shown in FIG. 14 was prepared.

Although this display device $D_4$ has almost the same structure as that of the display device $D_1$ prepared in Example 1, it is different in the structure in the points that a half mirror is used as the mirror as shown by reference numeral 412 and that a part (1%) of the light is allowed to permeate the half mirror 412 and condensed into a condenser lens 413 and detected for the light amount by a light amount detector 414.

On the other hand, regarding the driving of the display device, it is also almost the same as the driving of the display device $D_1$ prepared in Example 1. That is, the light flux $L_2$ emitted from the lamp 1 is controlled for the light amount by the quantity of light controller 4 and dispersed into a light of each component of blue, red and green and irradiated to respective liquid panels 2R, 2G and 2B, and on the screen 6, a color image is projected. The light amount control by the light amount controller 4 is executed in such a manner that, by the same method as Example 1, the target light amount is calculated (refer to reference numeral S201 of FIG. 15) and, based on the result of the calculation, the ultrasonic motor $M_1$ is driven (reference numeral S205 of FIG. 15).

Figure 15:
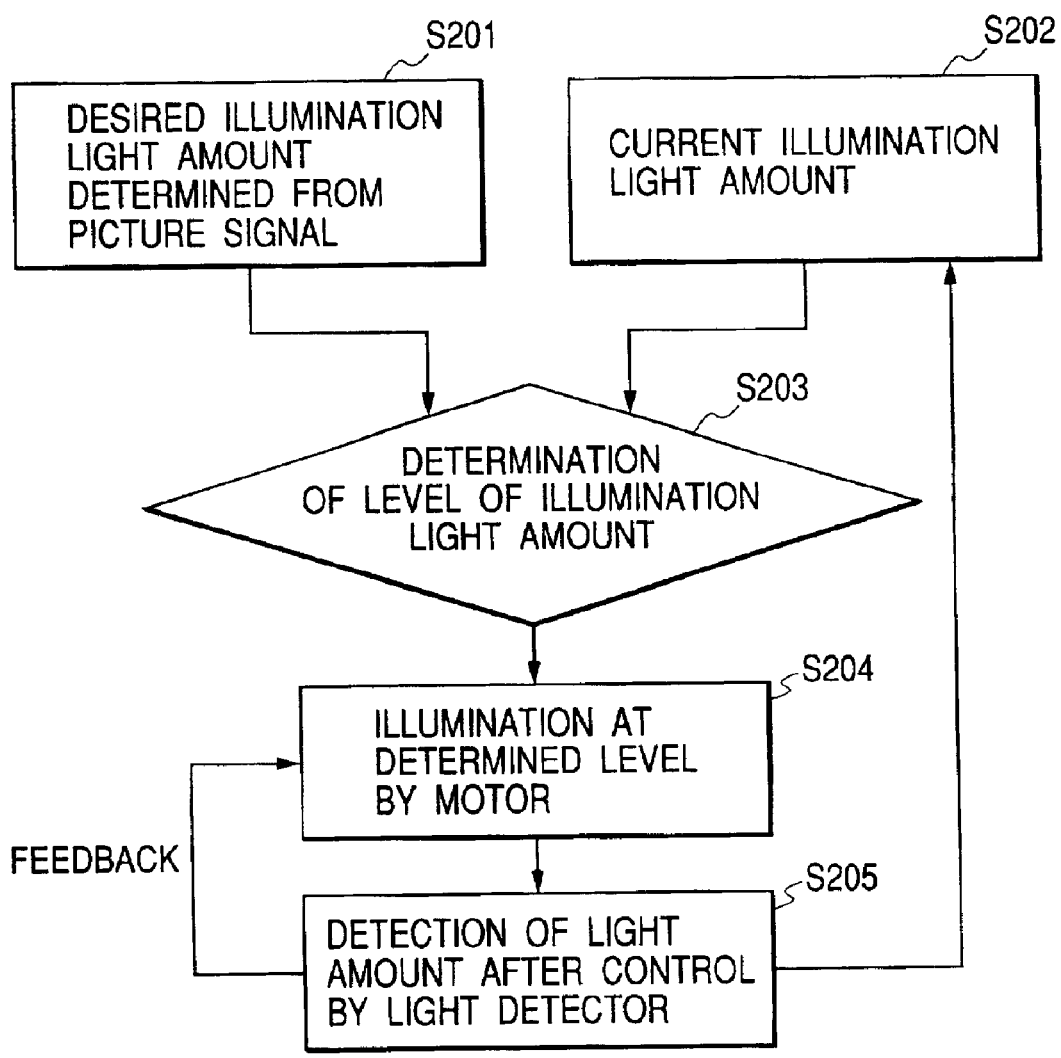
FIG. 15 is a flowchart for explaining one example of the control method of the display device.

Here, a part (1%) of the light which permeated the light amount controller 4 permeates the half-mirror 412 and the condenser lens 413 and is detected by the light amount detector 414, and the actual light amount is calculated (refer to reference numerals S205 and S202 of FIG. 15). Then, the above-described target light amount and the actual light amount are compared (refer to reference numerals S201 and S203 of FIG. 15) and the ultrasonic motor $M_1$ is driven so that both of them are equal to each other (refer to reference numeral S204).

Next, an effect of the present example will be described.

According to the present example, the light amount is detected by the quantity of light detector 414 and feedback-controlled so that the light amount can be allowed to agree with the target light amount in spite of various disturbances. For example, an extra-high pressure mercury lamp and a metal halide lamp are effective for miniaturizing a projector engine, but, on the other hand, an arc length is short being 1 to 1.3 mm and they have a property of easily fluctuating in the emitted amount of light. Nevertheless, even when they are used, the light amount can be made equal to the target light amount.

Because the light flux incident on the light amount detector 414 is constituted in such a manner that it is condensed by the condenser lens 413, it is enough for the light amount detector 414 to be a small-sized pin type, and by combining it with a high-speed amplifier, it can detect within an extremely short time of about several tens μm.

Further, according to the present example, the same effect as that of Example 1 can be obtained.

EXAMPLE 3

In the present example, a display device $D_2$ as shown in FIG. 5 was prepared.

Reference numeral 102 denotes a light modulation element. In the present example, a DMD panel was used. Reference numeral 104 denotes light amount controlling means. In the present example, a diaphragm was used.

Reference numeral 105 denotes a mirror, reference numeral 106 a condenser lens, reference numeral 107 an integrator, reference numeral 108 a convex lens, reference numeral 109 a dichroic filter, reference numeral 110 a reflection mirror, reference numeral 111 a convex lens, reference numeral 112 an aperture-stop and reference numeral 113 a projection lens, respectively.

In the present example, a parabolic reflector 10 and the condenser lens 106 having a relation:

$$4 \leq F4/F3 \leq 10 \quad \text{(Equation 1)}$$

wherein F3 is a focal length of the parabolic reflector 10 and F4 is a focal length of the condenser lens 106, was used so that at a front-end surface 107a of the integrator 107 a small light source image was formed.

The dichroic filter 109 is divided into three color filters of R (red), G(green) and B (blue) and configured so as to be rotationally driven.

Next, an operation of the present example will be described.

The light, which is emitted from the lamp 1 and reflected by the parabolic reflector 10, is reflected by the mirror 105 and condensed by passing through the condenser lens 106. Such a condensed light flux passes through the diaphragm 104 and forms a small light source image at the front-end surface 107a of the integrator 107. When the diaphragm 104 is squeezed, the amount of light incident to the integrator 107 can be reduced. The light flux incident to the integrator 107 is emitted in part as it is from a rear end surface 107b and the remainder, after repeating reflection inside the integrator 107, is emitted from the rear end surface 107b. The light emitted from the integrator 107 is condensed again by a convex lens 108 and irradiated to the dichroic filter 109. Because this dichroic filter 109 is rotationally driven, the irradiation light is dispersed in order into each light of R, G and B colors and led to a direction of the DMD panel 102 by the reflection mirror 110. Each color light is irradiated to the screen 6 through the routes of the flat convex lens 111→the DMD panel 102→the flat convex lens 111→the projection lens 113. On this occasion, at the opening portion of the diaphragm 112, a light source image having a similar figure as the light source is formed by the light which is regularly reflected by the DMD panel 102. This is because the lamp 1, the front side end surface 107a of the integrator 107, the reflection mirror 110 and the aperture-stop 112 mutually has a conjugate relation. The optical system constituted by the projection lens 113 and the condenser lens 111 is a system in which the DMD panel side is telecentric.

What is important in the optical system of the present example is that the rear side end surface 107b of the integrator 107 is image-formed on the DMD panel 102 by the convex lens 108 and the flat convex lens 111. In the rear side end surface 107b of the integrator 107, the light flux which permeates without being reflected in the inside of the integrator 107 and the light flux which is reflected one to several times lie one upon another so that a color irregularity of the light source and an luminance irregularity are eliminated to become an almost uniform light intensity distribution. Accordingly, if this rear side end surface 107b is allowed to have a conjugate relation with the display surface of the DMD panel 102 by the convex lens 108 and the flat convex lens 111, the color irregularity and the luminance irregularity are reduced on the display surface of the DMD panel and, as a result, the color irregularity and the luminance irregularity of the image which is displayed on the screen 6 are reduced. Further, by making the shape of the rear side end surface 107b of the integrator 107 almost the similar rectangular figure as the display surface of the DMD panel 102 and image-forming the rear side end surface 107b of the integrator 107 on the DMD panel 102 with an adequate multiplying factor, the panel is effectively irradiated.

In FIG. 5, the lens 106, the lens 108 and the lens 111 are made of single lens, respectively, but each system of these lenses may be constituted by a plurality of lenses. The same can be said with respect to each lens of the above-described example. Hence, the "convex lenses" referred to in the present specification is a lens system having a positive reflection factor.

The present example is a system in which, by rotation of the dichroic filter 109 as shown in FIG. 5, R, G and B colors are displayed by a time division. If the diaphragm 104 for use of the light amount control is modulated by synchronizing with one rotation, the same luminance modulation as that of Example 2 can be executed. Further, by synchronizing with the level of each color of the R, G and B colors time division, the diaphragm 104 can be adjusted and the illumination light amount can be modulated.

The present invention has the advantageous merits of modulating the illumination light amount with almost no cost incurred and making the DMD of the high dynamic range higher in the image quality of the high dynamic range.

As described above, according to the present invention, the light supplied for the image display is allowed to be controlled for the light amount by the light amount controlling means. Accordingly, when the image luminance is low, the light amount can be reduced and when the image luminance is high, the light amount can be increased and, consequently compared to the case where such a control is not executed for the light amount, high dynamic range can be realized.

Further, according to the present invention, because the picture signal having a low luminance is largely amplified, the image quality having a high contrast can be obtained.

On the other hand, when the picture signal having a high luminance is largely amplified, a luminance difference disappears. However, according to the present invention, because it is only slightly magnified, there arises no such a problem of the luminance difference. Further, in the area of high luminance display, by executing the pseudo-multi-gradation processing, the image quality (the gradation display performance) can be maintained.

What is claimed is:
1. A display device comprising:
   a light source for emitting a light;
   a light modulation element for modulating the emitted light; and
   picture signal inputting means for receiving a picture signal from the outside and inputting a driving signal for driving said light modulation element to said light modulation element, in which said light modulation element modulates the light based on the picture signal and an image is displayed, wherein said picture signal inputting means comprises target light amount calculating means and light amount controlling means, said target light amount calculating means calculating an adequate light amount for an image display and said light amount controlling means receiving the signal from said target light amount calculating means and controlling the light so as to obtain a target light amount; and wherein said picture signal inputting means changes signal amplification rates in at least two input ranges for changing input-output conversion characteristics according to an output of said target light amount calculating means, and in the two input ranges of the input-output conversion characteristics said picture signal inputting means largely amplifies the driving signal when the picture signal has a low luminance and slightly amplifies the driving signal when the picture signal has a high luminance, whereby an amplification rate of input at the low luminance is larger than an amplification rate of input at the high luminance.

2. The display device according to claim 1, wherein, when the picture signal has a high luminance, a pseudo multi-gradation process is executed.

3. The display device according to claim 1, wherein said light amount controlling means comprises a member for converting the light to a polarization light flux and a light amount adjusting member for controlling a permeable amount of the polarization light flux, and wherein by changing a rotational position of said light amount adjusting member, a light amount is controlled.

4. The display device according to claim 2, wherein said light amount controlling means comprises a member for converting the light to a polarization light flux and a light amount adjusting member for controlling a permeable amount of the polarization light flux, and wherein by changing a rotational position of said light amount adjusting member, a light amount is controlled.

5. The display device according to claim 3, wherein said light amount adjusting member is a phase plate.

6. The display device according to claim 4, wherein said light amount adjusting member is a phase plate.

7. The display device according to claim 2, wherein rotation of said light amount adjusting member is executed by an ultrasonic motor.

8. The display device according to claim 3, wherein rotation of said light amount adjusting member is executed by an ultrasonic motor.

9. The display device according to claim 4, wherein rotation of said light amount adjusting member is executed by an ultrasonic member.

10. The display device according to claim 5, wherein rotation of said light amount adjusting member is executed by an ultrasonic motor.

11. The display device according to claim 6, wherein rotation of said light amount adjusting member is executed by an ultrasonic motor.

12. A display device comprising:

a light source for emitting a light;

a light modulation element for modulating the emitted light; and picture signal inputting means for receiving a picture signal from the outside and inputting a driving signal for driving the light modulation element to said light modulation element, in which said light modulation element modulates the light based on the picture signal and an image is displayed, wherein said picture signal inputting means comprises target light amount calculating means and light amount controlling means, said target light amount calculating means calculating an adequate light amount for an image display and said light amount controlling means receiving the signal from said target light amount calculating means and controlling a light which is transmitted or reflected by said light modulation element so as to obtain a target light amount; and wherein said picture signal inputting means changes a signal amplification rate for changing input-output conversion characteristics corresponding to an output of said target light amount calculating means, and the signal amplification rate is set to two or more values corresponding to an input level, whereby an amplification rate of input at the low luminance is larger than an amplification rate of input at the high luminance.

13. The display device according to claim 12, wherein, when the picture signal has a high luminance, said picture signal inputting means amplifies by an amplification factor not more than an amplification factor used when the picture signal has a low luminance.

14. The display device according to claim 12, wherein, when the picture signal has a low luminance, the signal is amplified by an amplification factor of 1 or more.

* * * * *

UNITED STATES PATENT AND TRADEMARK OFFICE
CERTIFICATE OF CORRECTION

PATENT NO. : 6,891,524 B2  Page 1 of 1
APPLICATION NO. : 09/927479
DATED : May 10, 2005
INVENTOR(S) : Yukihiko Sakashita It is certified that error appears in the above-identified patent and that said Letters Patent is hereby corrected as shown below:

COLUMN 8:

Line 29, "described table) is calculated, and the lower" should read --light amount data is transmitted to the light amount controlling quality calculating--.
Line 30, should be deleted.

Signed and Sealed this

Fifteenth Day of August, 2006

JON W. DUDAS
*Director of the United States Patent and Trademark Office*